Nov. 10, 1959 G. JUNG 2,912,354
MOISTURE-PROOFED SEMICONDUCTOR ELEMENT
Filed June 19, 1958
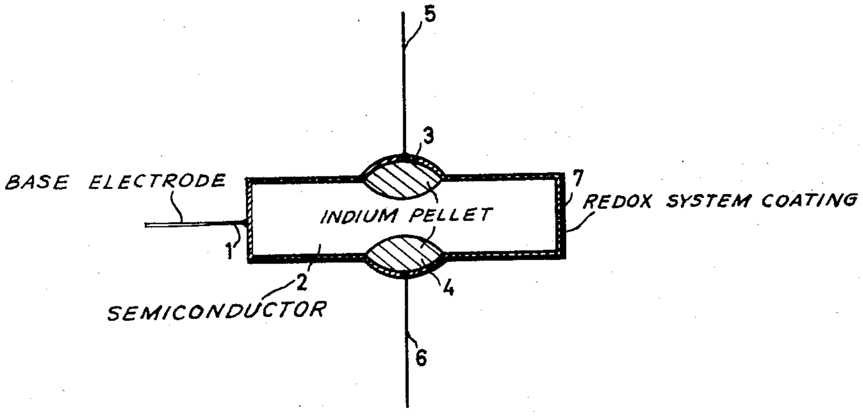
Inventor:
Gerhard Jung
By [signature] Atty.

United States Patent Office 2,912,354
Patented Nov. 10, 1959

2,912,354

MOISTURE-PROOFED SEMICONDUCTOR ELEMENT

Gerhard Jung, Munich, Germany, assignor to Siemens and Halske Aktiengesellschaft, Berlin and Munich, Germany, a corporation of Germany Application June 19, 1958, Serial No. 743,092
Claims priority, application Germany August 7, 1957
4 Claims. (Cl. 117—200)

This invention relates to semiconductor devices and is particularly concerned with a moisture-proofed semiconductor element and a method of making it.

The invention is based upon recognition of the fact that the characteristic current-voltage curves of p-n junctions in semiconductor elements are affected by the composition of the ambient atmosphere, causing changes with respect to the properties of the surface zones respectively due to adsorption and chemical resorption of gases. Particularly noticeable are changes caused by oxygen and water vapor, which may, for example, effect reversal of conductivity as compared with that prevailing interiorly of the semiconductor, that is, transition from p-conductivity interiorly to n-conductivity at the surface, and vice versa. The changes thereby effected with respect to the characteristic curves may be lasting; they may occur gradually in course of time, as is the case in the presence of water vapor. Crowded coverage of the surface of a semiconductor with water molecules also forms an electrolytically conductive coating, resulting in unstable characteristic curves and also raising the noise level. The avoidance, even of minute traces of moisture, is accordingly an important prerequisite for obtaining stable and substantially noise-free p-n junctions. Varnish coatings and the like have not proved satisfactory.

The object of the invention is to propose means for preventing the above explained instability and concomitant increase of noise. The general teaching of the invention provides for covering the surface of a semiconductor element with chemical compounds which are in cooperation with the semiconductor material adapted to absorb moisture molecules occurring upon the surface, in turn releasing equivalent amounts of oxygen which is effective to oxidize the semiconductor material at least partially.

Semiconductors are common metals or easily oxidizable compounds; accordingly, the surface of any semiconductor, due to unavoidable contact with air or due to having been subjected to chemical or electrolytical etching, is provided with an oxide coating consisting in part of defined oxides and in part of oxygen bound by adsorption. In the presence of thermodynamic equilibrium, there will be at the surface a certain equilibrium partial pressure $$p_{O_2\,(\text{semicond'r})}$$

of the oxygen. Upon providing the surface with a reduction-oxidation system, briefly referred to as redox system, the operation of which may be generally expressed by the equation $$\text{Oxidation stage} + mH_2O \lesseqgtr \text{reduction stage} + nO_2$$

there will appear, in the presence of water vapor, a relation $$\frac{p_{O_2}{}^n}{p_{H_2O}{}^m}$$

which is given by the equilibrium constant of the redox reaction $$K = \frac{\text{activity of the reduction stage}}{\text{activity of the oxidation stage}} \cdot \frac{p_{O_2}{}^n}{p_{H_2O}{}^m}$$

Assuming sufficient accuracy, the activties of the solid or fluid reduction- and oxidation stage may be considered as being constant; accordingly, to give an example for the redox system quinone/hydroquinone, with the reduction equation $$(1)\ \text{Quinone} + H_2O \lesseqgtr \text{hydroquinone} + 1/2O_2$$

there will apply:

$$K = \frac{p_{O_2}{}^{1/2}}{p_{H_2O}}$$

For example, if a quinone/hydroquinone mixture covers a germanium surface at which there is an equilibrium partial pressure $$p_{O_2(Ge)}$$

the operation (1) with $H_2O$ consumption must in the presence of moisture continue until there is obtained:

$$\frac{p_{O_2}{}^{1/2}}{p_{H_2O}} = \frac{p_{O_2(Ge)}{}^{1/2}}{p_{H_2O}} = K$$

The greater K, that is, the greater the oxidizing power of the redox system, the more will the $H_2O$ partial pressure be reduced which is with given $$p_{O_2(Ge)}$$

present in the equilibrium condition. Instead of using a mixture of oxidizing and reducing stage, an oxidizing stage alone may be used, since even small amounts of moisture traces will produce the oxidizing effect.

The above formulation of the operation of the redox system upon the semiconductor surface represents only one of several mutually equivalent formulations; expressing it in other words, the overall operation of the redox system is independent of the concepts concerning the particular mechanics of the individual operations into which the total reaction (1) may be subdivided.

It is apparent from the foregoing explanations, that a favorable effect of the redox system requires fulfillment of the following prerequisites: (1) The oxidation potential of the redox system must be greater than that of the system semiconductor/semiconductor oxide; and (2) the amount of the redox system provided must be sufficient to secure a complete adjustment of the redox equilibrium.

Assuming these prerequisites to be fulfilled, the redox system will (1) reduce the water vapor partial pressure and (2) will maintain constant a fixed oxygen partial pressure.

Examples of the redox systems to be used, depending upon the kind of semiconductor element include p-quinone/hydroquinone and analogous systems such as thymoquinone/thymohydroquinone, etc.; diphenylamin/diphenylbenzidin and derivatives thereof; indigo/indol and their derivatives; systems of the kind including disulfide compound/sulfhydryl compound; triarylmethane-redox systems, etc. The use of p-quinone/hydroquinone has been found particularly favorable in connection with alloyed germanium p-n-p transistors.

The use of the redox system or of the oxidized stage alone may be effected (*a*) in the case of solid or fluid substances respectively by spraying powdered material on or fusing it to the surface to be covered or by coating the surface with the fluid substance; (*b*) by vaporizing the material on the semiconductor surface; (*c*) by placing the material upon the semiconductor surface in dissolved condition and, if desired, subsequently vaporizing the solvent; (*d*) by intermixture with a varnish to be provided for mechanical protection or for dissipating heat; and (*e*) by chemical in-building of the redox system in a mechanically protective or heat dissipating varnish of the kind described by H. G. Cassidy, Journal of the American Chemical Society, volume 71 (1949), page 402. A silicon structure may thereby be used in place of the customary formaldehyde-phenol-resin base.

An example of the invention is shown in the accompanying drawing.

Referring now to the drawing, numeral 2 indicates a semiconductor wafer, for example, made of germanium. Numeral 1 is the base electrode. Pellets 3 and 4 of indium are alloyed to the semiconductor 2. Numerals 5 and 6 indicate leads connecting with the pellets 3 and 4 and being soldered thereto at 8 and 9. The element operates as a transistor by using, for example, 3 as a collector, 4 as an emitter, and 1 as the base. In accordance with the invention, the transistor is provided with a coating 7 consisting of a redox system.

The invention is not limited to the illustrated details. While advantageous, it may not be necessary in many cases to provide the entire surface of the semiconductor element with the protective coating disclosed herein.

Changes may be made within the scope and spirit of the appended claims.

I claim:

1. A p-n junction semiconductor element comprising a moisture-proofing coating made of material which coacts with the material of said element to absorb water molecules and to release amounts of oxygen equivalent thereto, the oxygen released being operative to oxidize said semiconductor material at least partially, said coating material comprising at least a component of a reduction-oxidation system selected from the group consisting of p-quinone/hydroquinone; thymoquinone/thymohydroquinone; diphenylamin/diphenylbenzidin; indigo/indol; systems of the kind of disulfide compound/sulfhydryl compound; and triarylmethane systems.

2. A semiconductor element according to claim 1, said coating comprises at least an oxidizing component of a reduction-oxidation system, the oxidizing potential of said system being greater than that of the system formed by the semiconductor jointly with the oxide thereof, the amount of the oxidizing component of the reduction-oxidation system being sufficient to produce complete reduction-oxidation equilibrium.

3. A semiconductor element according to claim 2, wherein said coating also comprises the reducing component of the reduction-oxidation system.

4. A semiconductor element according to claim 1, wherein said coating material consists of powdered material fused to the semiconductor surface.

References Cited in the file of this patent

UNITED STATES PATENTS

| | | |
|---|---|---|
| 2,754,456 | Madelung | July 10, 1956 |
| 2,798,189 | Alexander | July 2, 1957 |
| 2,809,132 | Bloem | Oct. 8, 1957 |
| 2,832,702 | Schwartz | Apr. 29, 1958 |